(12) United States Patent
Borchardt et al.

(10) Patent No.: US 11,352,223 B2
(45) Date of Patent: Jun. 7, 2022

(54) TRANSPORT SYSTEM AND TRANSPORT DEVICE

(71) Applicant: Beckhoff Automation GmbH, Verl (DE)

(72) Inventors: Uwe Borchardt, Vlotho (DE); Jörg Neufeld, Paderborn (DE)

(73) Assignee: Beckhoff Automation GmbH, Verl (DE)

( * ) Notice: Subject to any disclaimer, the term of this patent is extended or adjusted under 35 U.S.C. 154(b) by 0 days.

(21) Appl. No.: 17/142,505

(22) Filed: Jan. 6, 2021

(65) Prior Publication Data

US 2021/0122588 A1   Apr. 29, 2021

Related U.S. Application Data

(63) Continuation of application No. PCT/EP2019/067877, filed on Jul. 3, 2019.

(30) Foreign Application Priority Data

Jul. 13, 2018 (DE) .................... 10 2018 116 992.2

(51) Int. Cl.
*B65G 54/02* (2006.01)
*B65G 13/08* (2006.01)
(Continued)

(52) U.S. Cl.
CPC ............ *B65G 54/02* (2013.01); *B65G 13/08* (2013.01); *B65G 19/02* (2013.01); *B65G 39/12* (2013.01)

(58) Field of Classification Search
None
See application file for complete search history.

(56) References Cited

U.S. PATENT DOCUMENTS 6,876,107 B2   4/2005   Jacobs
8,720,673 B2   5/2014   Loecht
(Continued)

FOREIGN PATENT DOCUMENTS

DE        3702248 A1    8/1987
DE   102012103378 A1   10/2013
(Continued)

OTHER PUBLICATIONS

"GFX Hepco Guidance System for Beckhoff XTS Transport System" <https://www.hepcomotion.com/product/ring-guides-track-systems-and-segments/gfx-hepco-guidance-system-for-beckhoff-xts-transport-system/>, 3 pages.
(Continued)

*Primary Examiner* — Kavel Singh
(74) *Attorney, Agent, or Firm* — Dorsey & Whitney LLP

(57) ABSTRACT

A transport system and transport device guided via a plurality of rollers in a running direction along a running rail. The transport system has a curved running rail with first and second running surfaces at a first running rail side flank. First and second rollers form a first roller unit for the first running surface, and third and fourth rollers form a second roller unit for the second running surface. The first and/or second roller unit has a rocker unit with a rigid connection of the rotation axles of the first and second rollers of the first roller unit, and/or the rotation axles of the third and fourth rollers of the second roller unit, and a rocker axle. The rigid connection is pivotably supported about the rocker axle, arranged transversely to the running direction of the first and/or second roller unit, which has the rocker unit.

20 Claims, 6 Drawing Sheets

(51) Int. Cl.
  *B65G 19/02*   (2006.01)
  *B65G 39/12*   (2006.01)

(56) References Cited

U.S. PATENT DOCUMENTS

| | | | |
|---|---|---|---|
| 8,827,071 | B2 | 9/2014 | Van De Loecht |
| 9,056,720 | B2 | 6/2015 | Van De Loecht et al. |
| 9,555,720 | B2 | 1/2017 | Aumann et al. |
| 10,894,675 | B2 * | 1/2021 | Hartung ................. B65G 54/02 |
| 2017/0361731 | A1 | 12/2017 | Cromheecke et al. |
| 2018/0086565 | A1 | 3/2018 | Grosskreuz et al. |

FOREIGN PATENT DOCUMENTS

| | | |
|---|---|---|
| DE | 102014100636 A1 | 7/2015 |
| DE | 102014110714 A1 | 2/2016 |
| DE | 102016106621 A1 | 10/2017 |
| DE | 102017108572 A1 | 10/2018 |
| EP | 0636561 A1 | 2/1995 |
| EP | 2250904 A1 | 11/2010 |
| EP | 2838821 B1 | 5/2016 |
| GB | 2158404 A | 11/1985 |
| WO | 0064751 A1 | 11/2000 |
| WO | 2016162217 A1 | 10/2016 |
| WO | 2018145214 A1 | 8/2018 |

OTHER PUBLICATIONS

Beckhoff "AT2xxx, ATH2xxx | XTS motor modules" <https://www.beckhoff.com/de-de/produkte/motion/xts-linearer-produkttransport/at2xxx-ath2xxx-xts-motormodule/> 4 pages.
Beckhoff "HepcoMotion: Advanced Linear Solutions" <HepcoMotion.com> 2020, 7 pages.
Beckhoff "XTS | Linear product transport" <https://www.beckhoff.com/de-de/produkte/motion/xts-linearer-produkttransport/> 3 pages.
Beckhoff "XTS Guide Rails and Mover" <https://www.beckhoff.com/de-de/produkte/motion/xts-linearer-produkttransport/at9xxx-ath9xxx-xts-fuehrungsschienen-und-mover/> 3 pages.
International Preliminary Report on Patentability dated Oct. 14, 2020 in connection with International Patent Application No. PCT/EP2019/067877, 45 pages including English translation.
Examination Report dated Nov. 6, 2019 in connection with German patent application No. 10 2018 116 992.2, 16 pages including English translation.
Beckhoff New Automation Technology: "Benefit from intelligent drive technology. XTS. The extended Transport System." <www.beckhoff.com/XTS> Sep. 2015, 36 pages.
International Search Report and Written Opinion dated Jul. 3, 2019 in connection with International Patent Application No. PCT/EP2019/067877, 28 pages including English translation.
First Office Action dated Nov. 3, 2021 in connection with Chinese patent application No. 201980047031.3, 27 pages including English translation.

* cited by examiner

TRANSPORT SYSTEM AND TRANSPORT DEVICE

CROSS-REFERENCE TO RELATED APPLICATIONS

The present patent application is a continuation of International Patent Application PCT/EP2019/067877, filed 3 Jul. 2019, entitled TRANSPORT SYSTEM AND TRANSPORT DEVICE, and claims the priority of German patent application DE 10 2018 116 992.2, filed 13 Jul. 2018, entitled TRANSPORT SYSTEM UND TRANSPORTVORRICHTUNG, each of which is incorporated by reference herein, in the entirety and for all purposes.

FIELD

The present invention relates to a transport system and a transport device for a transport system.

BACKGROUND

Transport devices which have a plurality of rollers and which via the rollers have contact with a curved running rail of a transport system are inter alia already known from EP 2 838 821 B1. EP 2 838 821 B1 discloses a transport device which has a plurality of symmetrically constructed movable sliding members which are guided on a peripheral running rail. Each symmetrical sliding member half comprises in this instance three rollers which are arranged in a triangular arrangement, wherein two rollers are in abutment with a first running surface and a third roller is in abutment with a second running surface.

So that the rollers always have sufficient contact with the running rail, a specific force which ensures the pressure of the rollers on the running surfaces of the running rail is required. The force for the pressure of the rollers is divided uniformly over the two running surfaces of the running rail. In a triangular roller arrangement, as in EP 2 838 821 B1, the individual roller which is in abutment with the second running surface has to withstand the same force as the two rollers which are in abutment with the first running surface. Consequently, the individual roller always forms the weak point of the arrangement and becomes damaged first in the event of an overload.

In order to reduce wear, the individual roller can be constructed in the triangular roller arrangement with a significantly larger diameter than the diameter of the other two rollers. An increased diameter provides a larger contact surface-area for the force and the individual roller can thus be preserved longer. The disadvantage of this embodiment is, however, that the dimensions of the transport device increase as a result of the differently sized roller diameters.

However, if there is not sufficient structural space available for the embodiment of the transport device with the individual roller with increased diameter, for improved force distribution two rollers per running surface can be used in each case. The rollers may be arranged in a rectangle and be constructed with identical roller diameters. Under ideal conditions, the force for the pressure of the rollers in such an arrangement is then distributed uniformly over each roller. In the transition from a linear portion of the running rail to a curved portion, with such a roller arrangement there is often the problem that the first roller at the inner side of the curve loses contact with the running surface of the running rail and the transport device rests in an unstable manner on the running surfaces of the running rail since it begins to tilt in this region. This occurs regardless of the contour of the running rail during the transition from a linear portion to a curved running rail portion as a result of the geometry.

SUMMARY

The present invention provides an improved transport system and an improved transport device for a transport system.

EXAMPLES

According to a first aspect, a transport system having a curved running rail which has at a running rail side flank a first running surface and a second running surface and which comprises at least one transport device is proposed. The transport device is guided in a running direction along the running rail and has for guiding a plurality of rollers which are each rotatably supported about an individual rotation axle. A first roller and a second roller of the transport device form a first roller unit for rolling on the first running surface. A third and fourth roller of the transport device form a second roller unit for rolling on the second running surface. The first and second roller units are connected by a first carrier device which is constructed to pretension the first roller unit against the first running surface and the second roller unit against the second running surface. The first roller unit and/or the second roller unit has/have a rocker unit. The rocker unit has a rigid connection of the rotation axles of the first and second rollers of the first roller unit and/or a rigid connection of the rotation axles of the third and fourth rollers of the second roller unit and a rocker axle, wherein the rigid connection is pivotably supported about the rocker axle. The rocker axle is arranged transversely relative to the running direction of the first and second rollers of the first roller unit and/or the third and fourth rollers of the second roller unit which has the rocker unit.

According to a second aspect, a transport device which for use in a transport system having a curved running rail which has a first running surface and second running surface on a first running rail side flank is proposed. The transport device has for guiding on the running rail in a running direction a plurality of rollers which are each rotatably supported about an individual rotation axle. A first roller and a second roller of the transport device form a first roller unit for rolling on the first running surface, a third roller of the transport device form a second roller unit for rolling on the second running surface. The first roller unit and the second roller unit are connected by a first carrier device which is constructed to pretension the first roller unit against the first running surface and the second roller unit against the second running surface. The first running surface and the second running surface on the first running rail side flank are arranged with spacing from each other and facing each other and are orientated inwardly so that the first roller and the second roller of the first roller unit and the third roller of the second roller unit are also orientated inwardly. The second roller unit of the transport device has a fourth roller for rolling on the second running surface. The first roller unit and/or the second roller unit has/have a rocker unit, wherein the rocker unit has a rigid connection of the rotation axles of the first and second rollers of the first roller unit and/or a rigid connection of the rotation axles of the third and fourth rollers of the second roller unit and a rocker axle. The rigid connection is pivotably supported about the rocker axle, and the rocker axle is arranged transversely relative to the running direction of the first and second rollers of the first roller unit and/or the third and fourth rollers of the second roller unit which has the rocker unit.

According to a third aspect, a rocker unit which for use in a transport device is proposed. The rocker unit has a rigid connection of rotation axles of a first and second rollers of a first roller unit and/or a rigid connection of rotation axles of a third and fourth rollers of a second roller unit and a rocker axle. The rigid connection is pivotably supported about the rocker axle, and wherein the rocker axle is arranged transversely relative to the running direction of the first and second rollers of the first roller unit and/or the third and fourth rollers of the second roller unit which has the rocker unit

BRIEF DESCRIPTION OF THE DRAWINGS

The above-described properties, features and advantages of this invention, and the manner in which they are achieved, will become clearer and more clearly understood in connection with the following description of embodiments which are explained in greater detail in connection with the schematic drawings, in which.

DETAILED DESCRIPTION

Figure 1:
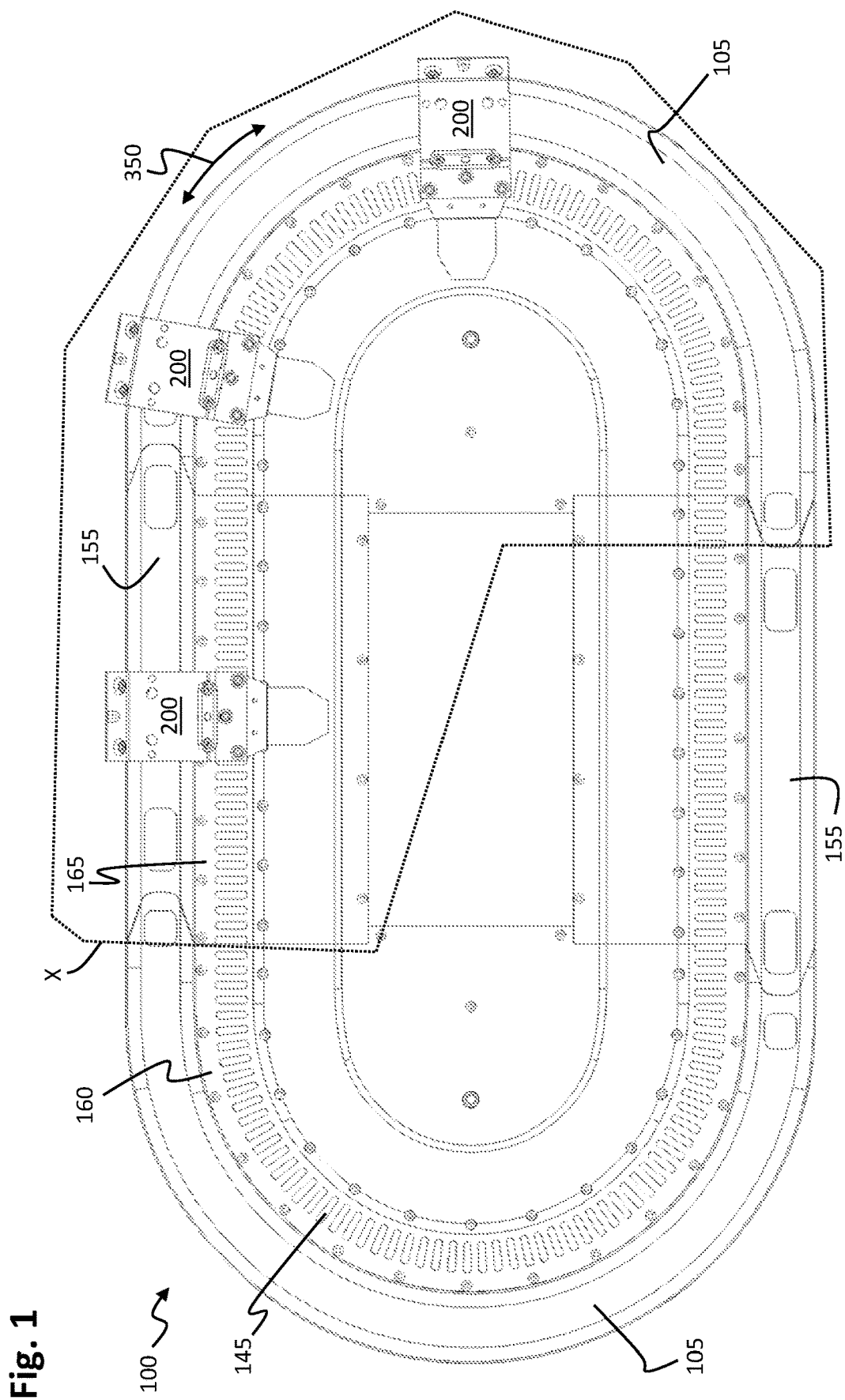
FIG. 1 is a side view of a transport system with transport devices.

With reference to the following figures, an embodiment of a transport system having at least one transport device is described. For example, the transport system may be a linear transport system which is used in automation technology. In addition to a linear drive, other drive systems for the transport system are also conceivable, such as, for example, a chain conveyor, a toothed belt drive or a drive system which comprises a gear mechanism. In this instance, the information relating to the use of the transport system is intended to be understood to be non-limiting since the invention can be used in all transport systems in which at least one transport device is provided. The following figures are described with reference to a linear transport system.

It should be noted that the figures are of a purely schematic nature and are not to true to scale. In this context, components and elements which are shown in the figures may be illustrated to an exaggeratedly large or small scale for better understanding. It should further be noted that the reference numerals in the figures have been selected to remain unchanged when they are elements and/or components and/or sizes which are constructed in an identical manner.

Using the rocker axle, the force which is required to press the rollers of the transport device onto the running surfaces of the running rail is distributed uniformly over two rollers of the roller unit which has the rocker unit. In this manner, it is possible to achieve a consistent wear of the two rollers. The rollers further always have, as a result of the pivotable bearing by the rocker axle, a ground contact with the running surfaces of the running rail. The rollers of the roller unit which has the rocker unit further behave by the rocker axle as an individual roller. In this manner, a reliable guiding of the transport device along the running rail can also be ensured with a high dynamic and in the region of a curved running rail.

In this context, it is possible for the first roller unit to have the rocker unit with the rocker axle. Furthermore, it is also conceivable for the second roller unit to comprise the rocker unit with the rocker axle. The first roller unit and the second roller unit may each also comprise a rocker unit and a rocker axle.

According to an embodiment, the running rail of the transport system has in the running direction a second running rail side flank. The transport device further comprises a third roller unit and a fourth roller unit which roll on the second running rail side flank. A second carrier device is used to connect the third roller unit and the fourth roller unit.

A fifth and sixth roller of the transport device may form the third roller unit. A seventh and eighth roller of the transport device may form the fourth roller unit. The third and fourth roller units are connected by the second carrier device which is constructed to pretension the third roller unit against a third running surface and the fourth roller unit against a fourth running surface of the second running rail side flank. The transport device as a result of the configuration with additional rollers on the second running rail side flank can be implemented in a more stable manner resting on the running rail. This additionally facilitates the ability of the transport device to be guided on the running rail of the transport system.

In another embodiment, the running rail of the transport system is constructed symmetrically in the running direction and the second running rail side flank comprises a third running surface and a fourth running surface. The transport device is further constructed symmetrically with respect to the running rail, wherein the third roller unit rolls on the third running surface and the fourth roller unit rolls on the fourth running surface. The third and fourth roller units are constructed in an identical manner to the first and second roller units. All of the features and functional arrangements described above and those described below with regard to the first roller unit and/or the second roller unit can consequently be transferred to the third roller unit and/or the fourth roller unit without requiring a separate description. Furthermore, the second carrier device may be constructed in an identical manner to the first carrier device.

The third roller unit may have a rocker unit which rigidly connects the rotation axles of the fifth and sixth rollers of the third roller unit. Furthermore, the rocker unit of the third roller unit may comprise a rocker axle which pivotably supports the rigid connection of the rotation axles of the fifth and sixth rollers. The rocker axle may also be orientated transversely to the running direction of the fifth and sixth rollers of the third roller unit. In the same manner, the first roller unit with the first and second roller on the first running rail side flank may have a rocker unit which is constructed in an identical manner. In place of the third roller unit, the fourth roller unit with the seventh and eighth roller may have an above-described rocker unit which connects the rotation axles of the seventh and eighth rollers to each other in a rigid manner and which comprises a rocker axle. In the same manner, the third and fourth roller units may each have a rocker unit, in the same way as the first and second roller units may each have a rocker unit. A symmetrical configuration of the running rail of the transport system and the transport device facilitates the construction and ensures an optimized force distribution over the individual roller units.

In addition, as a result of the symmetrical configuration of the transport device, an improved ground contact of the roller units with curved running rails can be provided.

In another embodiment, the transport device has a coupling element which is constructed in a curved manner. The coupling element is configured to connect the first carrier device and the second carrier device to each other. Using the arrangement, the pretensioning of the rollers of the first and second roller units against the first and second running surface, and the pretensioning of the rollers of the third and fourth roller units against the third and fourth running surfaces of the running rail can be implemented in a simple manner. The pretensioning of the rollers can be achieved by a so-called "overpressing", that is to say, the rollers of the roller units may be structurally spaced further apart from each other than the provided distance of the running surfaces, that is to say, the width of the running rail. The rollers of the roller units are thus pressed onto the running surfaces of the running rail. The force with which the rollers of the roller units are pressed against the running surfaces is distributed in a uniform manner over the running surfaces of the running rail and the number of rollers per running surface.

According to another embodiment, the rocker unit is constructed in a symmetrical manner. The rocker unit is located on an axis of symmetry of the rocker unit and is securely connected to the first carrier device and/or the second carrier device of the transport device. The symmetrical construction of the rocker unit enables simplified construction of the transport device. In addition, as a result of the symmetrical configuration of the rocker unit, costs for the production can be saved and the force can be distributed in a uniform manner over the individual rollers, in particular over the two rollers of the rocker unit.

In another embodiment, the rocker unit has bearing elements. The rigid connection of the rocker unit is constructed as a U-shaped connection element. The first and second rollers of the first roller unit and/or the third and fourth rollers of the second roller unit are in this instance placed on ends of the U-shaped connection element of the rocker unit and are secured with a first and second securing element. The arrangement thereby forms a U-shaped member. The bearing elements further pivotably support the U-shaped member about the rocker axle. The bearing elements protect the rocker axle which may, for example, be constructed as a bolt, from damage during the movement of the U-shaped member about the rocker axle. Additional bearing elements may, for example, be provided in the rollers of the first to fourth roller units in order to reduce the friction resistance during the movement of the rollers of the roller units along the running surfaces of the running rail. The bearing elements in the rollers and for the U-shaped member may, for example, be constructed as roller bearings. It is further conceivable for plain bearings to be used. Alternatively, a configuration of the rocker unit without bearing elements would also be possible for supporting the U-shaped member.

According to another embodiment, the first carrier device has a recess in which the rocker unit is located in a precisely fitter manner. The first and second rollers of the first roller unit and/or the third and fourth rollers of the second roller unit protrude beyond the recess of the first carrier device when the rocker unit is arranged in the recess. As a result of the space-saving construction, the transport device may be kept compact on the whole. It is therefore possible to simply integrate the transport device in existing transport systems which need a small spatial requirement without the transport system having to be re-configured in a complex manner.

Furthermore, the second carrier device may have an additional recess which is constructed in an identical manner and in which the second rocker unit fits precisely. The additional recess may as a result of the symmetrical embodiment of the transport device be constructed symmetrically relative to the recess of the first carrier device.

In another embodiment, the first and second rollers of the first roller unit and/or the third and fourth rollers of the second roller unit which has the rocker unit are adjacent to each other. Otherwise, that is to say, without the construction of the first roller unit and/or the second roller unit without a rocker unit, the first and second rollers of the first roller unit and/or the third and fourth rollers of the second roller unit are arranged spaced apart from each other. A roller arrangement in a triangular form has the advantage that smaller radii of curvature are possible.

In another embodiment, the first and second rollers of the first roller unit and/or the third and fourth rollers of the second roller unit are constructed with identical roller diameters. This simplifies the construction of the transport device and saves costs and complexity for the repair and maintenance. For example, the first to fourth rollers may be constructed to be of the same size and may be produced from plastics material and the running rail may be constructed with running surfaces of aluminum, which has the advantage that no lubrication of the system is required. A system which comprises steel (with respect to the rollers and the running rail with running surfaces) must in comparison be lubricated.

According to another embodiment, the first and second running surfaces of the first running rail side flank of the curved running rail of the transport system are arranged at an angle relative to an axis of symmetry of the running rail. The first and second running surfaces of the first running rail side flank are spaced apart from each other and face each other. Furthermore, the first carrier device is constructed in such a manner that the first and second rollers of the first roller unit and the third and fourth rollers of the second roller unit are orientated with respect to each other and are arranged at an angle relative to the axis of symmetry of the running rail on the first and second running surfaces at the first running rail side flank. As a result of the internal running surfaces, the transport device may be constructed in a more compact manner since the rollers of the roller units are also orientated internally. The running rail may, for example, have a dual T-shaped carrier profile in cross-section. Furthermore, it is conceivable for the transport device to be used for other running rail profiles. It is characteristic with a linear transport system for the transport devices to be moved with a high dynamic and for the rollers of the transport device to be able to thereby become rapidly worn. The arrangement of the rollers of the transport device according to the proposal can therefore advantageously contribute to reducing the wear. Furthermore, the transport device can be flexibly combined with different running rail contours of the transport system.

In another embodiment, the transport system has a drive device having a plurality of coils and magnets. The drive device is configured to drive the at least one transport device. The coils can be individually supplied with electric current and the magnets are arranged on the at least one transport device. The coils produce a magnetic field for the operational connection to the magnets which are arranged on the at least one transport device. The at least one transport device is caused to move by the operational connection. The advantage of the embodiment of the transport system is that no cables are required for the implementation. These would make the transport system complex and lead to limited movability of the transport device. Furthermore, the transport system requires no complex installation and maintenance since no gear mechanisms, belts or chains are used for the transport system.

There is further proposed a transport device which is suitable for use in a transport system according to one of the preceding embodiments.

The advantageous embodiments and developments of the proposed transport system and transport device as explained above and/or set out in the dependent claims can—with the exception, for example, of in cases of clear dependencies or incompatible alternatives—be used individually or also in any combination with each other.

FIG. 1 is a side view of a transport system 100 which, for example, has three transport devices 200. The running rail of the transport system 100 may be constructed as a closed track which has two curved running rail portions 105, also referred to below as a curved running rail 105, and two linear running rail portions 155, also referred to below as a linear running rail 155. Using the running rail, the transport devices 200 can be guided in a running direction 350. Furthermore, the transport system 100 may comprise curved motor modules 160 and linear motor modules 165, wherein the geometry of the motor modules can be varied and combined as desired, in the same manner as the contour of the curved and/or linear running rail 105, 155. The motor modules are constructed as linear motors. These linear motors have a plurality of stator teeth 145, wherein electrical coils which can be supplied with power individually and separately from each other are wound around at least some of the stator teeth 145. Consequently, it is possible using the coils to produce a travelling magnetic field.

Figure 2:
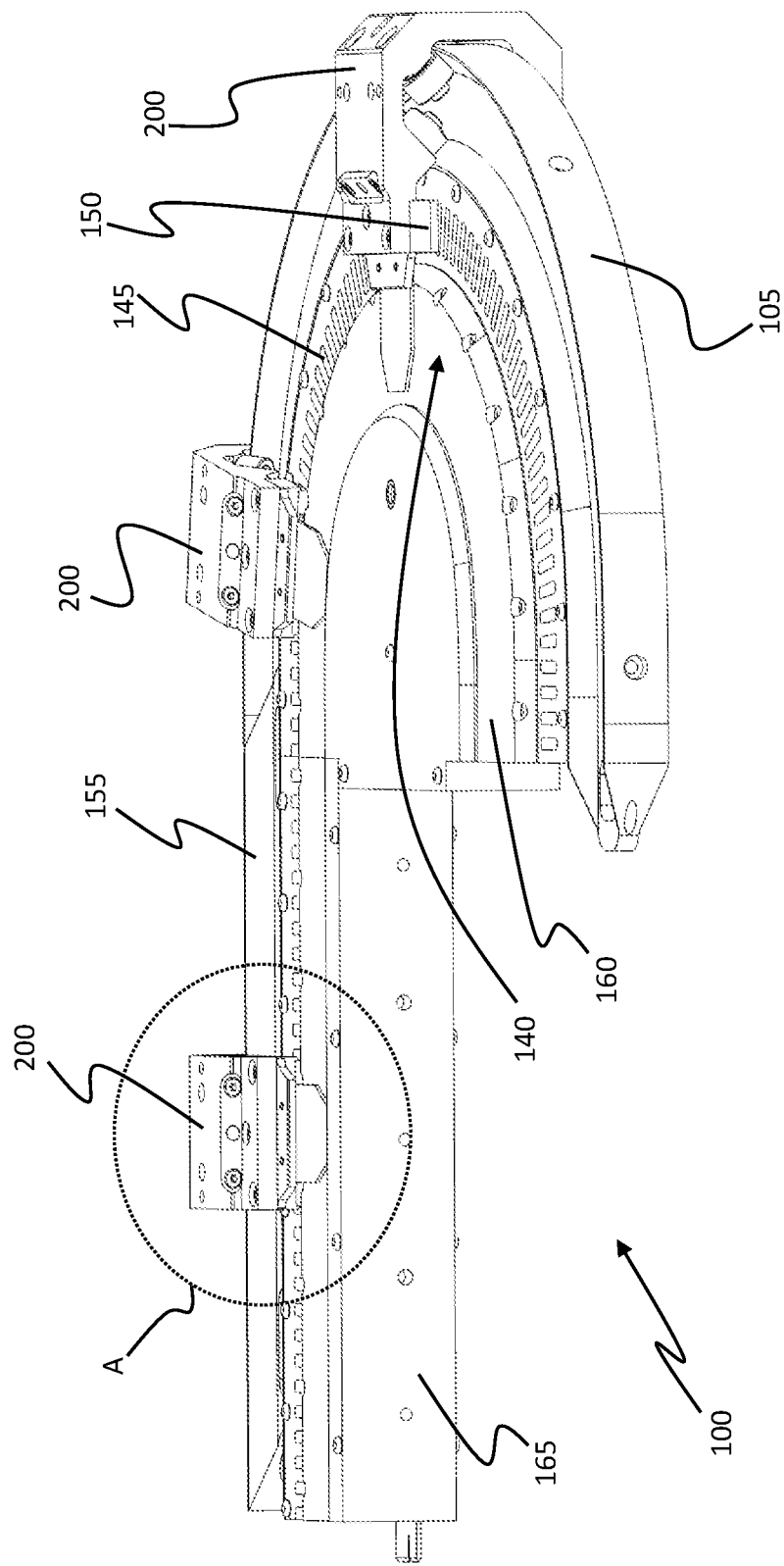
FIG. 2 is a perspective tilted view of a cut-out X of the transport system, with transport devices shown in FIG. 1.

FIG. 2 is a perspective and tilted view of a cut-out of a first marked region X of the proposed transport system 100 illustrated in FIG. 1. The transport system 100 has a curved running rail 105 and a linear running rail 155. Furthermore, the transport system 100 comprises at least one transport device 200, wherein in FIG. 2 (and in FIG. 1) three transport devices 200 are shown by way of example. The number of transport devices 200 can be freely selected and may also differ from the number illustrated.

Furthermore, the transport system 100 comprises a drive device 104 which has a curved motor module 160 and a linear motor module 165 and a plurality of magnets 150. The magnets 150 which are arranged on the transport devices 200 may be driven in connection with the travelling magnetic field described in relation to FIG. 1 and produced by the coils without requiring additional active drive elements on the transport devices. The current flow in the coils produces the travelling magnetic field for an operational connection to the magnets 150 of the transport devices 200. An operational connection describes an interaction of the travelling magnetic field of the coils with the magnet 150 of the transport devices 200, whereby the transport devices 200 are moved along the curved running rail 105 or linear running rail 155.

The transport devices 200 of the transport system 100 in FIGS. 1 and 2 are each arranged with spacing from each other. This spacing may vary depending on the embodiment of the transport system 100. The transport devices 200 of the transport system 100 may further be moved individually, moved freely in a group of several transport devices 200 or moved synchronously in a group of several transport devices 200. Consequently, the transport devices 200 of the transport system 100 can be used in a flexible manner for various positioning and/or transport tasks. The transport devices 200 may also be referred to as sliding members, comprising a platform for transporting an object, as a carriage, having a retention member for securing and transporting an object, or as a mover. Furthermore, other embodiments of the transport devices 200 are conceivable.

In addition, no cabling of the transport devices 200 is provided for the transport system 100. A lack of cabling has an advantageous effect on the free movability of the respective transport devices 200 in the transport system 100. In the same manner, the transport system 100 is thereby constructed in a less complex manner and with less susceptibility to wear. The installation and maintenance of the transport system 100 can also be simplified by the described embodiment since no gear mechanisms, belts or chains are used in the transport system 100.

Figure 3:
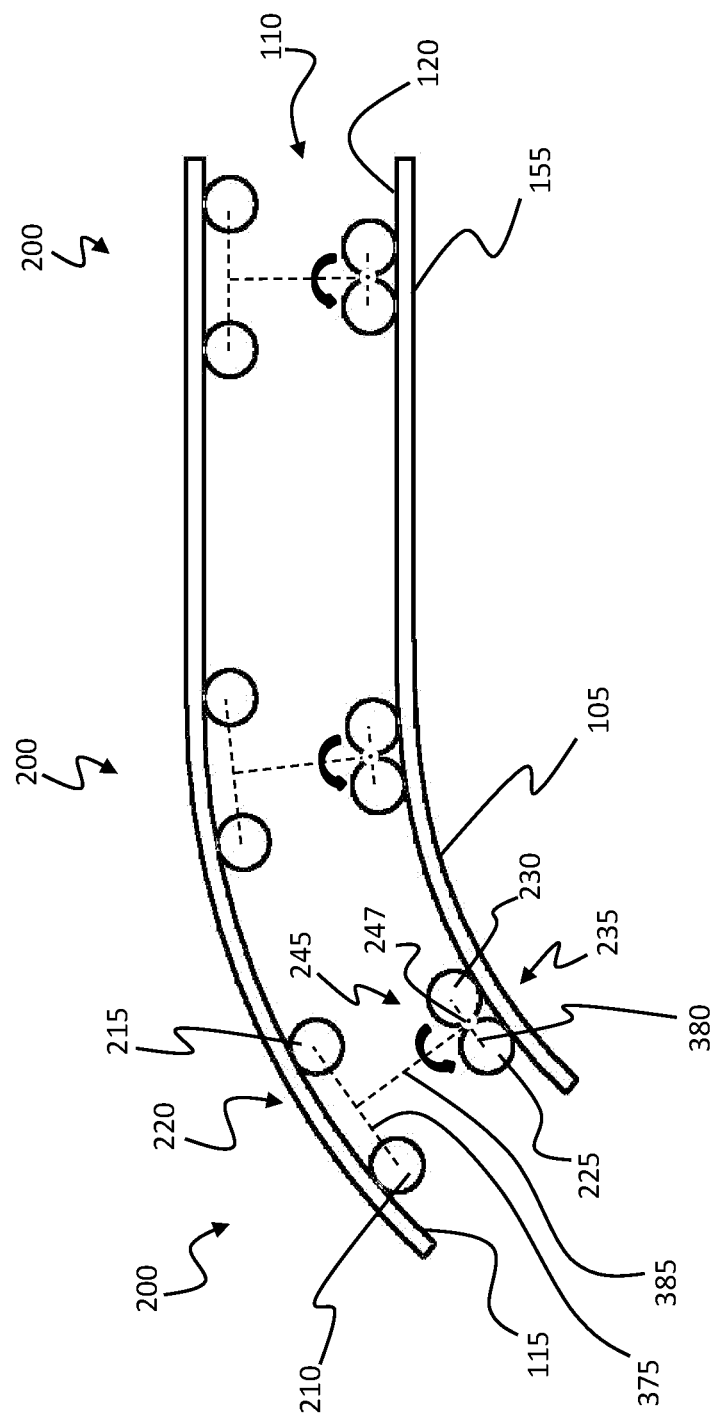
FIG. 3 is a schematic illustration of an arrangement of rollers of the transport devices according to FIG. 1.

The transport devices 200 each have a plurality of rollers, for moving the transport device 200 along running surfaces of the running rail of the transport system 100. The schematic arrangement of the rollers of the transport devices 200 is shown in FIG. 3. For the illustration in FIG. 3, a cut-out of the running rail comprising a linear running rail 155 and a curved running rail 105 and the roller arrangement of three transport devices 200 on a first running rail side flank 110 was selected by way of example. Since the individual transport devices 200 of the transport system 100 shown in FIGS. 1 and 2 can be constructed and configured in an equivalent manner, for the explanation of FIG. 3 reference is made to only one of the transport devices 200 according to the present proposal.

In the schematic illustration in FIG. 3, a first and second roller 210, 215 of a first roller unit 220 are arranged spaced apart and a third and fourth roller 225, 230 of a second roller unit 235 adjoin each other and have a first rocker unit 245. The first rocker unit 245 comprises a first rocker axle 247 and a rigid connection of rotation axles of the third and fourth rollers 225, 230 of the second roller unit 235. The proposal makes provision for the first roller unit 220 and/or the second roller unit 235 of the transport device 200 to be configured with a first rocker unit 245 and thereby to be able to uniformly wear the first and second rollers 210, 215 of the first roller unit 220 and/or the third and fourth rollers 225, 230 of the second roller unit 235 which has the first rocker unit 245. This is possible with a symmetrical configuration of the first rocker unit 245 and the third and fourth rollers 225, 230 of the second roller unit 235 which has the first rocker unit 245 and the first and second rollers 210, 215 of the first roller unit 220 as illustrated by way of example.

Furthermore, in an embodiment, the first and second rollers 210, 215 of the first roller unit 220 may have the first rocker unit 245 and in this manner the rotation axles of the first and second rollers 210, 215 may be rigidly connected. Alternatively, in another embodiment, it is also conceivable for the first and second rollers 210, 215 of the first roller unit 220 and the third and fourth rollers 225, 230 of the second roller unit 235 each to have a rocker unit 245 and the rotation axles of the first and second rollers 210, 215 of the first roller unit 220 or the rotation axles of the third and fourth rollers 225, 230 of the second roller unit 235 to be rigidly connected.

A first and second dashed line 375, 380 between the first and second rollers 210, 215 of the first roller unit 220 and the third and fourth rollers 225, 230 of the second roller unit 235 with the first rocker unit 245 extend in the schematic illustration parallel with each other. A third dashed line 385 connects the first and second lines 375, 380 and is orientated orthogonally with respect to the first and second lines 375, 380. The first rocker axle 247 is in this instance arranged on the intersection of the second and third line 380, 385 and illustrated as a black dot. The arrow above the first rocker axle 247 is in this instance intended to depict the pivotable bearing of the third and fourth rollers 225, 230 of the second roller unit 235 about the first rocker axle 247. The position of the first rocker axle 247 may vary in another embodiment, wherein the position of the first rocker axle 247 may move, for example, along the third line 385 in an upward direction, that is to say, beyond the third and fourth roller 225, 230. This may lead to the construction of the transport device 200 and the curved and linear running rail 105, 155 also having to be adapted. Another embodiment as described above is also conceivable, in which the first roller unit 220 has the first rocker unit 245 and the first and second rollers 210, 215 adjoin each other and the third and fourth rollers 225, 230 of the second roller unit 235 are arranged spaced apart from each other. So that the first to fourth rollers 210, 215, 225, 230 of the first and second roller units 220, 235 are in abutment with the first and second running surfaces 115, 120 of the first running rail side flank 110 of the curved and linear running rails 105, 155 and have contact, a force for pressing the first to fourth rollers 210, 215, 225, 230 is required.

The force for pressing the first to fourth rollers 210, 215, 225, 230, that is to say, the pretensioning of the first to fourth rollers 210, 215, 225, 230 against the first and second running surfaces 115, 120, is achieved by a so-called "overpressing". In order to achieve the overpressing, the first to fourth rollers 210, 215, 225, 230 of the transport device 200 are structurally spaced further apart by a factor than the width of the curved and linear running rail 105, 155 with the first and second running surfaces 115, 120 allows. The overpressing is accordingly achieved by the deliberate construction of protruding first to fourth rollers 210, 215, 225, 230 and presses the first and second rollers 210, 215 in this manner against the first running surface 115 and the third and fourth rollers 225, 230 against the second running surface 120 of the curved and linear running rail 105, 155.

Using the first rocker unit 245 provided in the present proposal and the overpressing of the first to fourth rollers 210, 215, 225, 230 of the first and second roller units 220, 235, it can be ensured that the third and fourth rollers 225, 230 of the second roller unit 235 comprising the first rocker unit 245 and/or the first and second rollers 210, 215 of the first roller unit 220, comprising the first rocker unit 245, always have contact with the first and second running surfaces 115, 120 of the curved and linear running rail 105, 155.

FIG. 3 shows the principle forming the basis of the proposal of the arrangement of the second roller unit 235, which has by way of example the first rocker unit 245, and the first roller unit 220 of the transport device 200 for the first running rail side flank 110. The following figures show a specific embodiment of the proposal with a linear running rail 155, which has an approximately dual-T-shaped carrier profile in cross-section and then in addition to the first running rail side flank 110 has a second running rail side flank 135 with a third roller unit 260 and a fourth roller unit 275, as illustrated, for example, in FIG. 4. The arrangement of the first to fourth rollers 210, 215, 225, 230 of the first and second roller unit 220, 235 on the first running rail side flank 110 and a fifth and sixth roller 250, 255 of the third roller unit 260 and a seventh and eighth roller 265, 270 of the fourth roller unit 275 on the second running rail side flank 135 of the transport device 200 is in this instance adapted to the linear running rail 155 with the dual-T-shaped carrier profile. The above-explained principle of the roller arrangement of the first to fourth rollers 210, 215, 225, 230 and the construction of the first and second roller units 220, 235 can in the same manner be transferred to the fifth to eighth roller 250, 255, 265, 270 and the third and fourth roller units 260, 275 and is not constructed separately at this location.

Figure 4:
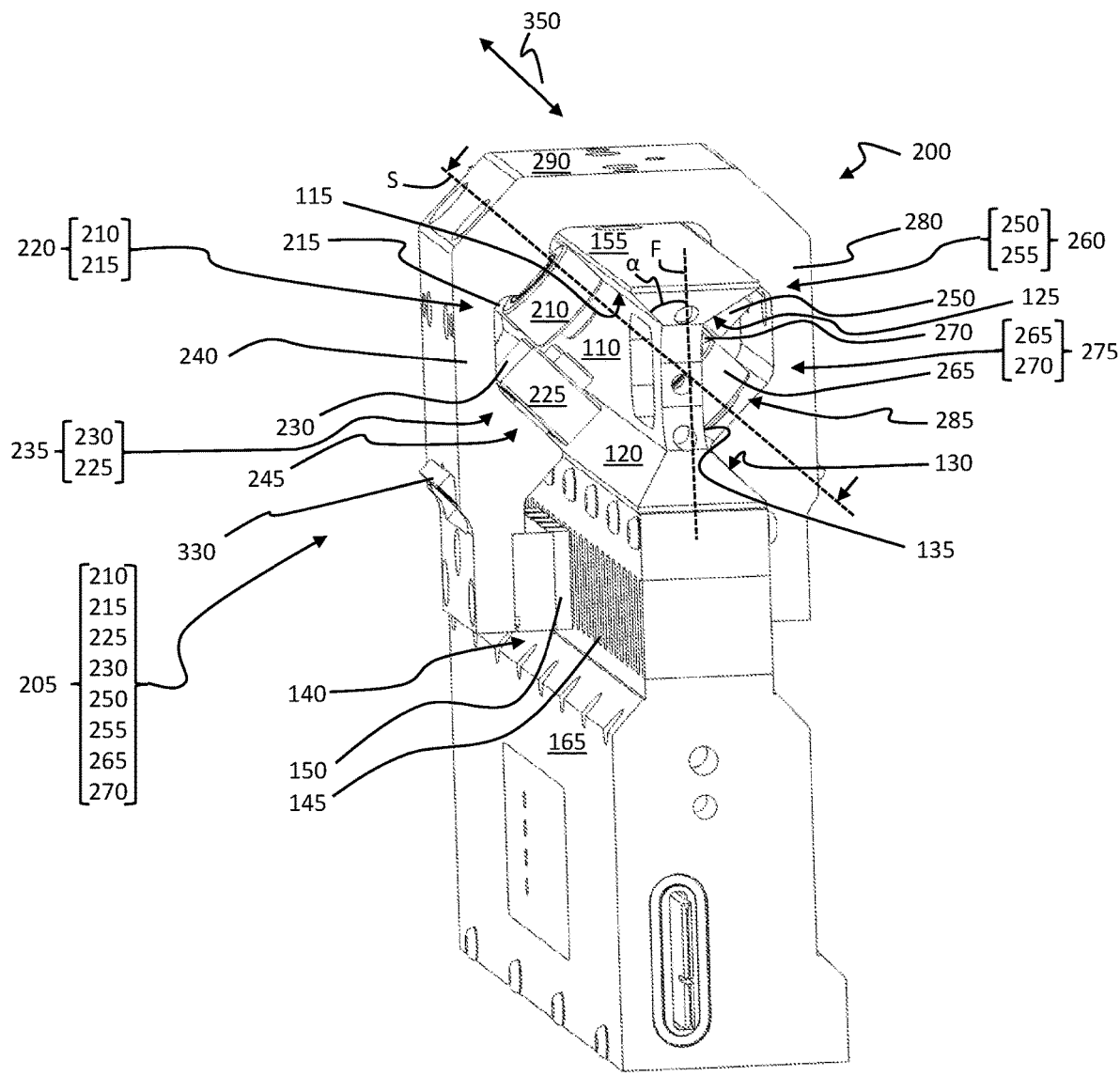
FIG. 4 is an enlarged and rotated perspective view of a transport device in a region A, marked in FIG. 2.
Figure 5:
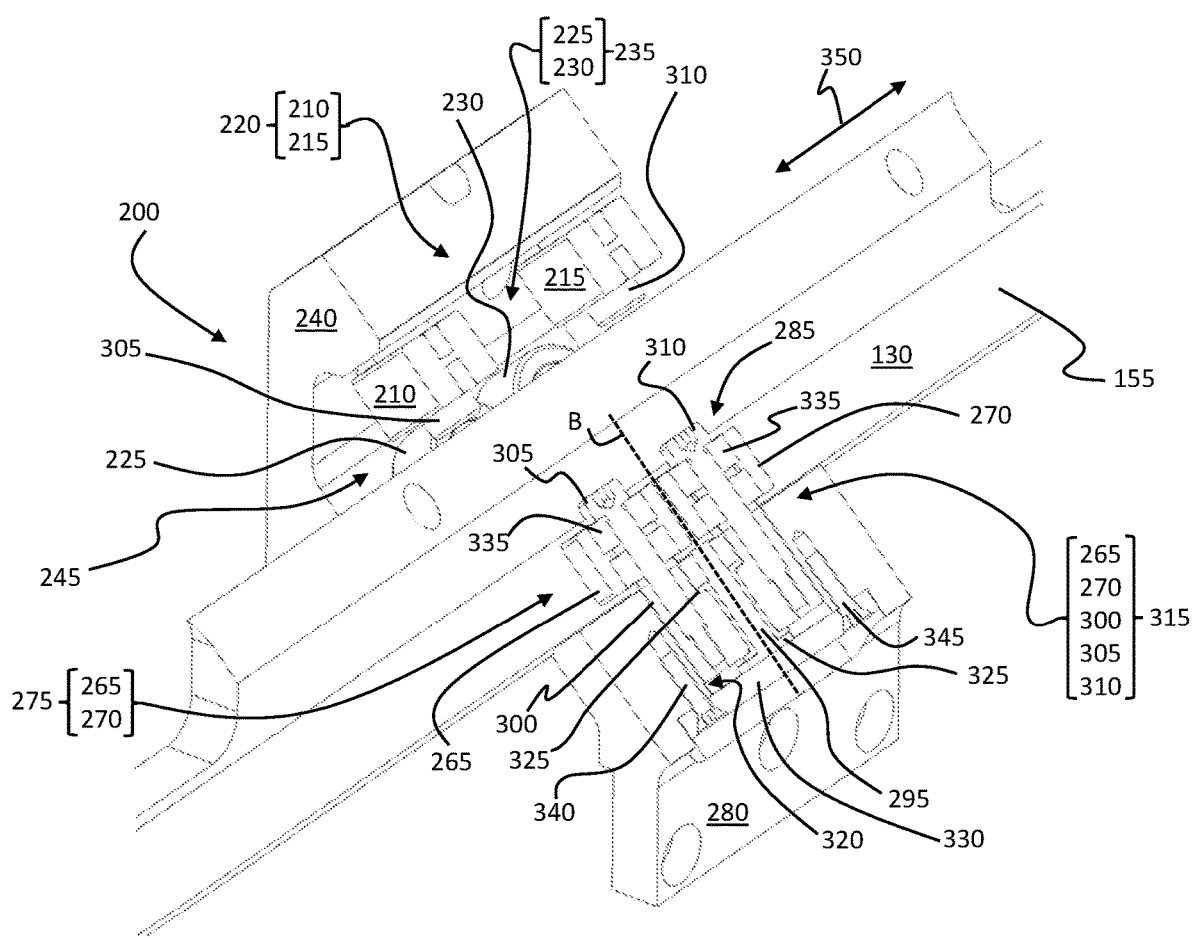
FIG. 5 is a perspective sectioned view of the transport device along a plane of section S, marked in FIG. 4.
Figure 6:
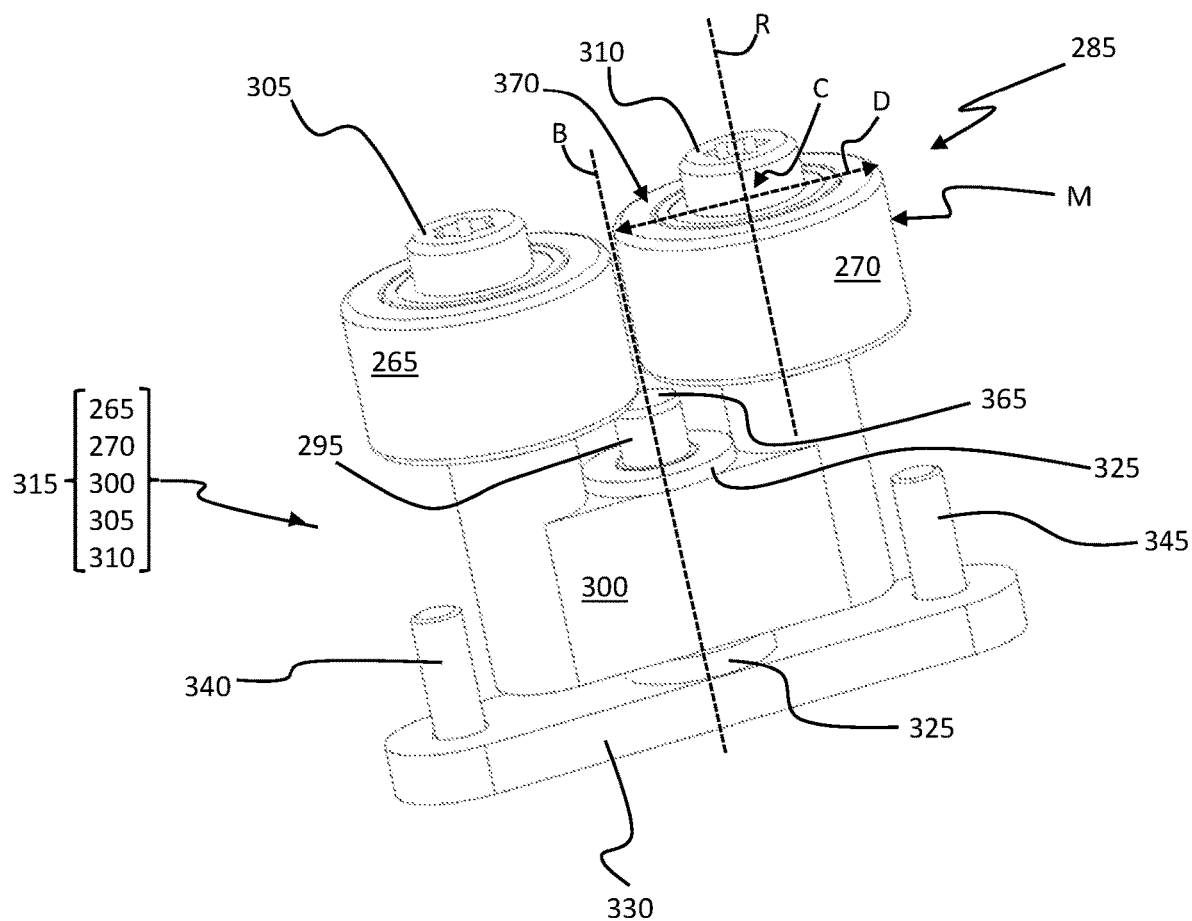
FIG. 6 is an enlarged perspective illustration of a rocker unit illustrated in FIG. 5.

FIG. 4 shows an enlarged and rotated perspective view of a transport device 200 in a second region A, marked in FIG. 2. For greater clarity, for the illustration of the transport device 200 in FIGS. 4, 5 and 6 there has been selected a linear running rail 155, along which the transport device 200 moves. For example, the running direction 350 of the transport device 200 may extend as illustrated in FIGS. 4, 5 and 6. Furthermore, other embodiments of the running direction 350 of the transport device 200, in particular also along a curved running rail 105, as illustrated in FIGS. 1 and 2, are also conceivable. The linear running rail 155 of the transport system 100 comprises the first running rail side flank 110 and the second running rail side flank 135. The first and second running surfaces 115, 120 are formed on the first running rail side flank 110. The third and fourth running surfaces 125, 130 are formed on the second running rail side flank 135. The first and second running surfaces 115, 120 are spaced apart from each other and arranged facing each other and the third and fourth running surfaces 125, 130 are spaced apart from each other and arranged facing each other.

Furthermore, the linear running rail 155 of the transport system 100 has an axis of symmetry F, as illustrated in FIG. 4. The first to fourth running surfaces 115, 120, 125, 130 are arranged in each case at an angle α with respect to the axis of symmetry F of the linear running rail 155. The angle α is shown by way of example for illustration of the arrangement of the first running surface 115, with which the first roller unit 220 is in abutment, with respect to the axis of symmetry F of the running rail, wherein a in degrees is: 0°<α<90°. For example, a may assume the value 45°. The remaining angles α for the arrangement of the second running surface 120 with respect to the axis of symmetry F and the arrangement of the third running surface 125 with respect to the axis of symmetry F and the arrangement of the fourth running surface 130 relative to the axis of symmetry F are not contained in FIG. 4 for the sake of clarity. Since the running rail 155 is constructed on the whole symmetrically with respect to the running direction 350, the arrangements of the second to fourth running surfaces 120, 125, 130 each have the same angles α with respect to the axis of symmetry F of the running rail.

The linear running rail 155 of the transport system 100 as illustrated in FIG. 4 has in cross-section by way of example an approximately dual-T-shaped carrier profile. However, the transport device 200 with the first to fourth roller unit 220, 235, 260, 275 is not limited to the running rail profile shown in FIG. 4, but instead can be used for any running rail profiles and running rail contours, such as, for example, S curves, X profiles, etcetera. The advantage of the embodiment of the transport system 100 with the linear running rail 155 with a double T-shaped carrier profile in which the first to fourth running surfaces 115, 120, 125 130 are orientated inward and facing each other is that the transport device 200 can thereby be constructed with compact dimensions. The dimensions of the transport device 200 may increase in contrast with another arrangement of the first to fourth running surfaces 115, 120, 125, 130 of the linear running rail 155 which may be caused, for example, by another running rail profile. The present proposal is additionally not limited to the use of a symmetrically constructed linear running rail 155 but instead can also be used for asymmetrically constructed linear running rails 155.

The above-described embodiment of the linear running rail 155 and the following description of the embodiment of a first carrier device 240 and a second carrier device 280 can apply equally to the embodiment of the curved running rail 105 and to the embodiment of the linear running rail 155 which are shown in FIGS. 1 and 2.

The transport device 200 has a first carrier device 240, a coupling element 290 and a second carrier device 280. The coupling element 290 of the transport device 200 may be constructed in a curved manner and be provided to connect the first carrier device 240 and the second carrier device 280 to each other. The first carrier device 240 is configured to pretension the first roller unit 220 against the first running surface 115 and the second roller unit 235 against the second running surface 120, wherein the first roller unit 220 comprises the first roller 210 and the second roller 215 and the second roller unit 235 comprises the third roller 225 and the fourth roller 230. The second carrier device 280 is constructed to pretension the third roller unit 260 against the third running surface 125 and the fourth roller unit 275 against the fourth running surface 130, wherein the third roller unit 260 comprises the fifth roller 250 and the sixth roller 255 and the fourth roller unit 275 comprises the seventh roller 265 and eighth roller 270. The plurality of rollers 205, that is to say, the first to eighth rollers 210, 215, 225, 230, 250, 255, 265, 270, may be constructed with identical roller diameters. It is also conceivable, if space is available, to construct the first to eighth rollers 210, 215, 225, 230, 250, 255, 265, 270 with different roller diameters. Furthermore, the first to eighth rollers 210, 215, 225, 230, 250, 255, 265, 270 may be produced from the same material, for example, the first to eighth rollers 210, 215, 225, 230, 250, 255, 265, 270 may be produced from plastic material.

The pretensioning of the first to fourth roller units 220, 235, 260, 275 with respect to the first to fourth running surfaces 115, 120, 125, 130 is implemented by the above-described overpressing by the first and second roller unit 220, 235 and the third and fourth roller units 260, 275 being constructed to be structurally spaced further apart than the linear running rail 155 on the first running rail side flank 110 and the second running rail side flank 135 is wide. The overpressing presses the first to fourth roller units 220, 235, 260, 275 against the first to fourth running surfaces 115, 120, 125, 130 of the linear running rail 155 and thus ensures contact of the first to eighth rollers 210, 215, 225, 230, 250, 255, 265, 270 of the first to fourth roller units 220, 235, 260, 275 with the first to fourth running surfaces 115, 120, 125, 130.

This is possible since the first and second roller units 220, 235 are connected to the first carrier device 240. Furthermore, the third and fourth roller units 260, 275 are connected to the second carrier device 280, and the first and second carrier devices 240, 280 are joined together by the curved coupling element 290. The first carrier device 240, the second carrier device 280 and the coupling element 290 may, for example, be produced from aluminum, but other materials are also conceivable. When aluminum is used, the first carrier device 240, the second carrier device 280 and the coupling element 290 of the transport device 200 can be resiliently deformed and thereby resiliently support the transport device 200 on the linear running rail 155 of the transport system 100. In this instance, the resilient bearing and the pretensioning of the transport device 200 may be achieved without the use of additional components, such as, for example, springs, but instead only provided by a selective use of the material property and the construction of the transport device 200.

The linear motor which is used to drive the transport device 200 and which comprises the linear motor module 165 shown in FIG. 4 further controls the position of the transport device 200 on the linear running rail 155 of the transport system 100. Using the transport device 200, a desired position on the linear running rail 155 of the transport system 100 is intended to be able to be approached with a high dynamic and at the same time a good travel dynamic, that is to say, a good ground adhesion of the first to fourth roller units 220, 235 260, 275 of the transport device 200, for the use of a curved running rail 105, as illustrated in FIGS. 1 to 3, can also be ensured. In this instance, the quality of the position control of the linear motor is better, the harder the transport device 200 is cushioned on the running rail, that is to say, the higher the pretensioning of the first to fourth roller units 220, 235, 260, 275 is constructed with respect to the first to fourth running surfaces 115, 120, 125, 130.

The first carrier device 240 is constructed in such a manner that the first to fourth rollers 210, 215, 225, 230 of the first and second roller units 220, 235 are orientated with respect to each other and form a V-shaped arrangement. The first and second roller units 220, 235 are each arranged at the angle α with respect to the axis of symmetry F of the linear running rail 155. The first and second roller units 220, 235 are in abutment with the first and second running surfaces 115, 120 and roll via their rotation axles, in the running direction 350 on the first and second running surfaces 115, 120.

The second carrier device 280 is further configured in such a manner that the fifth to eighth rollers 250, 255, 265, 270 of the third and fourth roller units 260, 275 are orientated with respect to each other and form a V-shaped arrangement. The third and fourth roller units 260, 275 are each arranged at the angle α with respect to the axis of symmetry F of the running rail 155. The third and fourth roller units 260, 275 are in abutment with the third and fourth running surfaces 125, 130 and roll via their rotation axles in the running direction 350 on the third and fourth running surfaces 125, 130.

Accordingly, the first to fourth roller units 220, 235 260, 275 are arranged symmetrically relative to the axis of symmetry F of the linear running rail 155 on the first to fourth running surfaces 115, 120, 125, 130 and the transport device 200 consequently has a symmetrical configuration which is adapted to the linear running rail 155 of the transport system.

The transport device 200 shown in FIG. 4 has below the linear running rail 155 the drive device 140. The magnets 150 of the drive device 140 are in this instance fitted to the inner sides of the transport device 200 facing the linear motor module 165, wherein, as a result of the perspective view of FIG. 4, only the magnets 150 which are arranged on the first carrier device 240 can be seen. Additional magnets 150 are arranged on the second carrier device 280 in a similar manner. The stator teeth 145 of the drive device 140, which are at least partially wound with coils located opposite the arrangement of the magnets 150. As a result of the symmetrical construction of the transport device 200, the stator teeth 145 with the coils of the drive device 104 are arranged between the magnets 150 which are arranged on the first carrier device 240 and the magnets 150 which are arranged on the second carrier device 280.

The second roller unit 235 has the first rocker unit 245, wherein the first rocker unit 245 is in abutment via the third and fourth rollers 225, 230 on the second running surface 120 on the running rail side flank 110 of the linear running rail 155. The first rocker unit 245 has the first rocker axle 247 and the rigid connection of the rotation axles R of the third and fourth rollers 225, 230. The second roller unit 235 as a result of the construction of the first rocker unit 245 is pivotably supported about the first rocker axle 247.

The fourth roller unit 275 has a second rocker unit 285 which substantially corresponds to the first rocker unit 245. The second rocker unit 285 is in abutment via the seventh and eighth rollers 265, 270 on the fourth running surface 130 at the additional running rail side flank 135 of the linear running rail 155. The second rocker unit 285 has the second rocker axle 295 and the rigid connection of the rotation axles R of the seventh and eighth rollers 265, 270. The fourth roller unit 275 as a result of the construction of the second rocker unit 285 is pivotably supported about the second rocker axle 295.

The first rocker unit 245 illustrated in FIG. 4 comprises the first rocker axle 247, which is securely connected to a cover 330 by the first carrier device 240. Furthermore, a movable bearing of the first rocker axle 247 is also conceivable. In a similar manner, the second rocker unit 285 comprises the second rocker axle 295 which is securely connected to a cover 330 by the second carrier device 280. In an alternative embodiment, a movable bearing of the second rocker axle 295 is also conceivable in this instance.

Also conceivable is an embodiment of the transport device 200 and in which the first and/or the third roller unit(s) 220, 260 has/have a rocker unit having a rigid connection of the rotation axles R of the first and second rollers 210, 215 or fifth and sixth rollers 250, 255 and a rocker axle. In addition, the first and the third roller units 220, 260 may each comprise a rocker unit with the mentioned features.

FIG. 5 is a perspective sectioned view of the transport device 200 along a plane of section S in FIG. 4. FIG. 5 shows in a similar manner to FIG. 4 the first and second rollers 210, 215 of the first roller unit 220 and the third and fourth rollers 225, 230 of the second roller unit 235, wherein the second roller unit 235 has the rocker unit 245. In FIG. 5, according to an embodiment, it is also conceivable for the first roller unit 220 to be constructed with a first rocker unit 245 or for the first and second roller units 220, 235 to be constructed at the same time with rocker units.

The first roller 210 is connected to the first carrier device 240 by a first securing element 305 and the second roller 215 is connected to the first carrier device 240 by a second securing element 310. The first and second securing elements 305, 310 may, for example, be constructed as screws. Furthermore, other securing means are also possible, for example, pins, to which the rollers are adhesively bonded, bolts, etcetera, which are constructed to connect the first and second rollers 210, 215 of the first roller unit 220 to the first carrier device 240 and thereby to enable a pretensioning of the first and second rollers 210, 215 against the first running surface of the first running rail side flank of the linear running rail 155. The second roller unit 235 with the first rocker unit 245 is also connected to the first carrier device 245.

FIG. 5 shows that the first and second rollers 210, 215 of the first roller unit 220 are arranged spaced apart from each other and the third and fourth rollers 225, 230 of the second roller unit 235 which has the first rocker unit 245 with the first rocker axle 247 are adjacent to each other. With this configuration, a simplified construction of a triangular roller arrangement is possible. In this instance, the triangular roller arrangement comprises two rollers which are in abutment with and roll on the first running surface and two rollers which are in abutment with and roll on the second running surface, wherein the rollers which are in abutment with and roll on the second running surface are adjacent to each other and are arranged centrally with respect to the spacing of the two rollers which are in abutment with and roll on the first running surface. For the embodiment in FIG. 5, therefore, the second roller unit 235 with the first rocker unit 245 is arranged centrally with respect to the spacing which the two rollers of the first roller unit 220 have. There is thereby produced a tilted, triangular arrangement of the first to fourth rollers 210, 215, 225, 230 on the first running rail side flank, wherein the tilted arrangement results from the inclination or arrangement of the running surfaces with respect to the axis of symmetry of the linear running rail 155.

For an optimum force distribution over the first to fourth rollers 210, 215, 225, 230 of the first and second roller units 220, 235, the triangular arrangement of the first to fourth rollers 210, 215, 225, 230 of the transport device 200 is constructed in a symmetrical manner, A symmetrical triangular arrangement of the first to fourth rollers 210, 215, 225, 230 may contribute to the transport device 200, with respect to its dimensions in the direction of the linear running rail 155, being able to be constructed in a compact manner. It is also conceivable for the third and fourth rollers 225, 230 of the second roller unit 235 which has the first rocker unit 245 to be spaced further apart from each other. In order to then be able to further ensure the symmetrical triangular roller arrangement of the transport device 200, the first and second rollers 210, 215 of the first roller unit 220 must also be arranged to be spaced further apart from each other. This then results in the dimensions of the transport device 200 along the linear running rail 155 increasing.

Furthermore, in an embodiment, the first to fourth rollers 210, 215, 225, 230 of the transport device 200 may also be arranged in an asymmetrical triangular form, that is to say, the two rollers of the second roller unit 235 with the first rocker unit 245 and the first rocker axle 247 are then located at a different distance from the first rocker axle 247. In such an embodiment, however, as a result of the lever principle it is possible—when the first rocker unit 245 is considered with the third and fourth rollers 225, 230 as a dual-sided lever which is pivotably supported about the first rocker axle 247 (rotation axle)—for more force to be transmitted to the roller which is located at a shorter distance from the first rocker axle 247 than to the roller with a longer lever arm, that is to say, a greater distance from the first rocker axle 247 (the first rocker axle 247 is illustrated in FIG. 3). This may promote the wear of the roller which is subjected to the heavier load since it becomes more rapidly worn as a result of the transmission of force.

The seventh and eighth rollers 265, 270 of the transport device 200 form the fourth roller unit 275. The fourth roller unit 275 rolls on the fourth running surface 130 of the linear running rail 155 and has a second rocker unit 285. The second rocker unit 285 is constructed in a similar manner to the first rocker unit 245 and comprises an axis of symmetry B. On the axis of symmetry B there is a second rocker axle 295 of the second rocker unit 285. The second rocker axle 295 is orientated transversely relative to the running direction 350 of the seventh and eighth rollers 265, 207 of the fourth roller units 275 which comprises the second rocker unit 285, and in the embodiment illustrated is constructed as a bolt. However, other embodiments of the second rocker axle 295 are also conceivable, such as, for example, a pin. The second rocker axle 295 is securely connected by a cover 330 to the second carrier device 280, wherein the cover 330 is fixed by a third and fourth securing element 340, 345. Alternatively, a movable second rocker axle 295 is also conceivable. The third and fourth securing elements 340, 345 are, for example, constructed as screws. Bolts and pins which are adhesively bonded, etcetera, are also conceivable in order to carry out the fixing of the cover 330.

Furthermore, the second rocker unit 285 has a rigid connection of the rotation axles R of the seventh and eighth rollers 265, 270, wherein the rigid connection is constructed as a U-shaped connection element 300. The second rocker axle 295 supports in this instance the rigid connection of the rotation axles of the seventh and eighth rollers 265, 270 of the fourth roller unit 275 in a pivotable manner. The seventh and eighth rollers 265, 270 of the fourth roller unit 275 are connected to the U-shaped connection element 300, in a similar manner to the other rollers, by a first and second securing element 305, 310. To this end, the seventh and eighth rollers 265, 270 are placed at the ends of the U-shaped connection element 300 of the second rocker unit 285 and form together with the first and second securing elements 305, 310 and the U-shaped connection element 300 a U-shaped member 315. The U-shaped member 315 may in this instance be constructed as a rigid member, and the first and second securing elements 305, 310 as a shoulder screw, as other screws, or as one of the above-mentioned alternative securing means for the fixing of the cover 330.

Furthermore, the second rocker unit 285 has bearing elements 325, wherein the bearings 325 pivotably support the U-shaped member 315 about the second rocker axle 295. The bearing elements 325 are illustrated in FIG. 6 in greater detail and may be provided to protect the second rocker axle 295. The bearing elements 325 may be constructed as ball or plain bearings, alternatively it is possible to pivot the U-shaped member 315 about the second rocker axle 295 without bearing elements 325. The U-shaped member 315 may be supported in an axial direction in order to be constructed in the most stable manner possible, that is to say, to have little play.

The seventh and eighth rollers 265, 270 may, as described above, have additional bearing elements 335 which may be provided to reduce the friction resistance of the seventh and eighth rollers 265, 270 during the movement along the fourth running surface 130. The additional bearing elements 335 may, as described above, also be constructed as ball bearings or plain bearings. In the same manner, the first to sixth rollers 210, 215, 225, 230, 250, 255 may have additional bearing elements 335 which are constructed as ball or plain bearings. The bearing elements of the first rocker unit 245 may be constructed in a similar manner to the bearing elements 325 of the second rocker unit 325 or may alternatively not be provided in the first rocker unit 245.

The second carrier device 280 has a recess 320 in which the second rocker unit 285 is located in a precisely fitting manner. If the second rocker unit 285 is arranged in the recess 320, the seventh and eighth rollers 265, 270 protrude beyond the recess 320 in the second carrier device 280. The precise fitting of the recess 320 and the second rocker unit 285 enables a space-saving configuration of the transport device 200. The first carrier device 240 may also have such a recess in which the first rocker unit 245 is located. In an alternative embodiment of the transport device 200, the first and third roller units 220, 260 may also each have a rocker unit. The first carrier device 240 and the second carrier device 280 may then comprise additional recesses, in a similar manner to the recess 320.

The features described relating to the configuration of the second rocker unit 285 with the axis of symmetry B and the rigid connection of the rotation axles R of the seventh and eighth rollers 265, 270 may, as a result of the symmetry of the transport device 200 and the identical construction of the first and second roller units 220, 235 and the third and fourth roller units 260, 275, also apply to the configuration of the first rocker unit 245 and the rigid connection of the rotation axles R of the third and fourth rollers 225, 230. The rigid connection of the rotation axles R of the third and fourth rollers 225, 230 may also be configured as an additional U-shaped connection element, wherein the additional U-shaped connection element is pivotably supported about the first rocker axle 247. If the first roller unit 220 and the third roller unit 260 have additional rocker units, the rotation axles R of the first and second rollers 210, 215 or the rotation axles R of the fifth and sixth rollers 250, 255 may in each case be rigidly connected by additional U-shaped connection elements.

FIG. 6 shows an enlarged perspective illustration of the second rocker unit 285 illustrated in FIG. 5 and additionally comprises the cover 330 and the third and fourth securing elements 340, 345 for connecting the second rocker axle 295 of the second rocker unit 285 to the second carrier device 280. The bearing elements 325 of the second rocker unit 285 are arranged between the cover 330 and the U-shaped member 315 and the U-shaped member 315 and the free end 365 of the second rocker axle 295 which is illustrated in FIG. 6. For simplified illustration, the second carrier device 280 is illustrated in FIGS. 4 and 5. For this reason, the second rocker axle 295 may have a free end 365 which, as shown in FIG. 5, does not open in the second carrier device 280.

The second rocker unit 285 is constructed in a symmetrical manner and comprises the axis of symmetry B on which the second rocker axle 295 is located. The seventh and eighth rollers 265, 270 are adjacent to each other and are connected by the first and second securing elements 305, 310 to the U-shaped connection element 300. The seventh and eighth rollers 265, 270, the U-shaped connection element 300, and the first and second securing elements 305, 310 form the U-shaped member 315 in a similar manner to FIG. 5. In FIG. 6, the roller diameter D is illustrated by way of example for the eighth roller 270. The seventh roller 265 may also be configured with the same roller diameter D, in the same manner as the first to sixth rollers 210, 215, 225, 230, 250, 255, as already explained above.

Furthermore, FIG. 6 shows by way of example the rotation axle R of the eighth roller 270. The rotation axle of the eighth roller 270 extends through a circle center C of a circular face 370 in the case of a cylindrical construction of the eighth roller 270. The eighth roller 270 is in abutment with the covering face M with the fourth running surface and rolls via the rotation axle R thereof along the fourth running surface on the linear and curved running rail 155, 105. In the same manner, the first to sixth rollers 210, 215, 225, 230, 250, 255 and the seventh roller 265 may have such a rotation axle R which extends through the circle center C of the circular face 370 of the similarly cylindrical first to sixth rollers 210, 215, 225, 230, 250, 255 and the seventh roller 265. The first to sixth rollers 210, 215, 225, 230, 250, 255 and the seventh roller 265 may then in a similar manner to the eighth roller 270 be in abutment with the covering face thereof against the first to fourth running surfaces 115, 120, 125, 130 and roll via the rotation axles R thereof along the first to fourth running surfaces 115, 120, 125, 130. It is further conceivable to construct the first to eighth rollers 210, 215, 225, 230, 250, 255, 265, 270 in a geometric shape different from that illustrated in FIG. 6.

The second rocker axle 295 is arranged below the adjacent seventh and eighth rollers 265, 270 of the fourth roller unit 285 and is surrounded at both sides by the U-shaped connection element 300 and can, as already explained, in place of the free end 365 open in the second carrier device 280. In place of the U-shaped connection element 300, as illustrated in FIGS. 5 and 6, other geometric shapes are conceivable, by which the rotation axles R of the second and/or fourth roller unit(s) 235, 275 which each have the first and second rocker units 245, 285 can be rigidly connected. If the symmetrical configuration of the first and/or second rocker unit(s) 245, 285 is maintained, the first and/or second rocker axle/axles 247, 295 can further be located in the axis of symmetry B of the first and/or second rocker unit 245, 285.

All the above-explained features of the second rocker unit 285 with the second rocker axle 295 (and the fourth roller unit 275, which comprises the seventh and eighth rollers 265, 270) which have been explained in connection with FIGS. 4 to 6, can equally be transferred to the first rocker unit 245 with the first rocker axle 247 (and the first roller unit 220, which comprises the first and second rollers 210, 215 and/or the second roller unit 235, which comprises the third and fourth rollers 225, 230). With reference to FIG. 3, the significant notion of the invention has been described by the second roller unit 235 which has the third and fourth rollers 225, 230 and, furthermore, the first rocker unit 245 with the first rocker axle 247. In the following figures, for explanation of additional features of the rocker unit and the rocker axle, reference has been made only to the second rocker unit 285 with the second rocker axle 295 and the fourth roller unit 275 with the seventh and eighth rollers 265, 270. The additional features of the rocker unit are accordingly not limited to the second rocker unit 285 with the second rocker axle 295.

The invention has been described in detail by preferred embodiments. In place of the embodiments described, additional embodiments are conceivable and may have additional variations or combinations of described features. For this reason, the invention is not limited by the disclosed examples since other variations can be derived therefrom by the person skilled in the art without departing from the protective scope of the invention.

TABLE 1

List of References (100-385)

| | |
|---|---|
| 110 | First running rail side flank |
| 115 | First running surface |
| 120 | Second running surface |
| 125 | Third running surface |
| 130 | Fourth running surface |
| 135 | Second running rail side flank |
| 140 | Drive device |
| 145 | Stator teeth |
| 150 | Magnets |
| 155 | Linear running rail |
| 160 | Curved motor module |
| 165 | Linear motor module |
| 200 | Transport device |
| 205 | Plurality of rollers |
| 210 | First roller |
| 215 | Second roller |
| 220 | First roller unit |
| 225 | Third roller |
| 230 | Fourth roller |
| 235 | Second roller unit |
| 240 | First carrier device |
| 245 | First rocker unit |
| 247 | First rocker axle |
| 250 | Fifth roller |
| 255 | Sixth roller |
| 260 | Third roller unit |
| 265 | Seventh roller |
| 270 | Eighth roller |
| 275 | Fourth roller unit |

TABLE 1-continued

List of References (100-385)

| | |
|---|---|
| 280 | Second carrier device |
| 285 | Second rocker unit |
| 290 | Coupling element |
| 295 | Second rocker axle |
| 300 | U-shaped connection element |
| 305 | First securing element |
| 310 | Second securing element |
| 315 | U-shaped member |
| 320 | Recess |
| 325 | Bearing elements |
| 330 | Cover |
| 335 | Additional bearing elements |
| 340 | Third securing element |
| 345 | Fourth securing element |
| 350 | Running direction |
| 355 | Fifth securing element |
| 360 | Sixth securing element |
| 365 | Free end of the second rocker axle |
| 370 | Circular face |
| 375 | First dashed line |
| 380 | Second dashed line |
| 385 | Third dashed line |

TABLE 2

List of References (A to α)

| | |
|---|---|
| A | Second marked region |
| B | Axis of symmetry (rocker unit) |
| C | Circle center |
| D | Roller diameter |
| F | Axis of symmetry (running rail) |
| M | Covering face |
| R | Rotation axle |
| S | Plane of section |
| X | First marked region |
| α | Acute angle |

What is claimed is:

1. A transport system having:
a curved running rail which has at a first running rail side flank a first running surface and a second running surface, and
at least one transport device which is guided in a running direction along the curved running rail;
wherein the transport device has for guiding a plurality of rollers which are each rotatably supported about an individual rotation axle,
wherein a first roller and a second roller of the transport device form a first roller unit for rolling on the first running surface,
wherein a third roller and a fourth roller of the transport device form a second roller unit for rolling on the second running surface,
wherein the first roller unit and the second roller unit are connected by a first carrier device which is constructed to pretension the first roller unit against the first running surface and the second roller unit against the second running surface,
wherein the first running surface and the second running surface on the first running rail side flank are arranged with spacing from each other and facing each other and are orientated inwardly so that the first roller and the second roller of the first roller unit and the third roller of the second roller unit are also orientated inwardly,
wherein the first roller unit and/or the second roller unit has/have a rocker unit, wherein the rocker unit has a rigid connection of the rotation axles of the first and second rollers of the first roller unit and/or a rigid connection of the rotation axles of the third and fourth rollers of the second roller unit and a rocker axle, wherein the rigid connection is pivotably supported about the rocker axle, and wherein the rocker axle is arranged transversely relative to the running direction of the first and second rollers of the first roller unit and/or the third and fourth rollers of the second roller unit which has the rocker unit.

2. The transport system according to claim 1, wherein the curved running rail has in the running direction a second running rail side flank, wherein the transport device comprises a third roller unit and a fourth roller unit which roll on the second running rail side flank, and wherein the third roller unit and the fourth roller unit are connected by a second carrier device.

3. The transport system according to claim 2, wherein the curved running rail is constructed symmetrically in the running direction and the second running rail side flank comprises a third running surface and a fourth running surface, wherein the transport device is constructed symmetrically with respect to the curved running rail and the third roller unit rolls on the third running surface and the fourth roller unit rolls on the fourth running surface, wherein the third and fourth roller units are constructed in an identical manner to the first and second roller units, and wherein the second carrier device is constructed in an identical manner to the first carrier device.

4. The transport system according to claim 3, having a coupling element which is constructed in a curved manner, wherein the coupling element is configured to connect the first carrier device and the second carrier device to each other.

5. The transport system according to claim 1, wherein the rocker unit is constructed in a symmetrical manner, and wherein the rocker axle is located in an axis of symmetry of the rocker unit and is securely connected to the first carrier device of the transport device.

6. The transport system according to claim 1, wherein the rocker unit has bearing elements, wherein the rigid connection of the rocker unit is constructed as a U-shaped connection element, wherein the first and second rollers of the first roller unit and/or the third and fourth rollers of the second roller unit are placed on ends of the U-shaped connection element of the rocker unit and are secured with a first securing element and a second securing element and the arrangement forms a U-shaped member, and wherein the bearing elements pivotably support the U-shaped member about the rocker axle.

7. The transport system according to claim 1, wherein the first carrier device has a recess in which the rocker unit is located in a precisely fitting manner, and wherein the first and second rollers of the first roller unit and/or the third and fourth rollers of the second roller unit protrude beyond the recess of the first carrier device when the rocker unit is arranged in the recess.

8. The transport system according to claim 1, wherein the first and second rollers of the first roller unit and/or the third and fourth rollers of the second roller unit which has the rocker unit are adjacent to each other, and wherein the first and second rollers of the first roller unit and/or the third and fourth rollers of the second roller unit are otherwise arranged spaced apart.

9. The transport system according to claim 1, wherein the first and second rollers of the first roller unit and/or the third and fourth rollers of the second roller unit are constructed with identical roller diameters.

10. The transport system according to claim 1, wherein the first and second running surfaces are arranged on the first running rail side flank of the curved running rail at an angle relative to an axis of symmetry of the curved running rail, wherein the first and second running surfaces of the first running rail side flank are spaced apart from each other and face each other, and wherein the first carrier device is constructed in such a manner that the first and second rollers of the first roller unit and the third and fourth rollers of the second roller unit are orientated relative to each other and are arranged at an angle with respect to the axis of symmetry of the curved running rail on the first and second running surfaces at the first running rail side flank.

11. The transport system according to claim 1, having a drive device having a plurality of coils and magnets, wherein the drive device is configured to drive the at least one transport device, wherein the coils can be individually supplied with electric current, wherein the magnets are arranged on the at least one transport device, wherein the coils produce a magnetic field for an operational connection to the magnets which are arranged on the at least one transport device, and wherein the at least one transport device is caused to move by the operational connection.

12. A transport device for a transport system having a curved running rail which has a first running surface and second running surface on a first running rail side flank, wherein the transport device has for guiding on the curved running rail in a running direction a plurality of rollers which are each rotatably supported about an individual rotation axle, wherein a first roller and a second roller of the transport device form a first roller unit for rolling on the first running surface, wherein a third roller of the transport device forms a second roller unit for rolling on the second running surface, wherein the first roller unit and the second roller unit are connected by a first carrier device which is constructed to pretension the first roller unit against the first running surface and the second roller unit against the second running surface, wherein the first running surface and the second running surface on the first running rail side flank are arranged with spacing from each other and facing each other and are orientated inwardly so that the first roller and the second roller of the first roller unit and the third roller of the second roller unit are also orientated inwardly, wherein the second roller unit of the transport device has a fourth roller for rolling on the second running surface, wherein the first roller unit and/or the second roller unit has/have a rocker unit, wherein the rocker unit has a rigid connection of the rotation axles of the first and second rollers of the first roller unit and/or a rigid connection of the rotation axles of the third and fourth rollers of the second roller unit and a rocker axle, wherein the rigid connection is pivotably supported about the rocker axle, and wherein the rocker axle is arranged transversely relative to the running direction of the first and second rollers of the first roller unit and/or the third and fourth rollers of the second roller unit which has the rocker unit.

13. The transport device according to claim 12, wherein the first and second rollers of the first roller unit and/or the third and fourth rollers of the second roller unit which has the rocker unit are adjacent to each other, and wherein the first and second rollers of the first roller unit and/or the third and fourth rollers of the second roller unit are otherwise arranged spaced apart, and wherein the two mutually adjacent rollers are arranged centrally with respect to the spacing of the two spaced-apart rollers.

14. The transport device according to claim 12, wherein the curved running rail has in the running direction a second running rail side flank, wherein the transport device comprises a third roller unit and a fourth roller unit which roll on the second running rail side flank, and wherein the third roller unit and the fourth roller unit are connected by a second carrier device.

15. The transport device according to claim 12, wherein the rocker unit is constructed in a symmetrical manner, and wherein the rocker axle is located in an axis of symmetry of the rocker unit and is securely connected to the first carrier device of the transport device.

16. The transport device according to claim 12, wherein the rocker unit has bearing elements, wherein the rigid connection of the rocker unit is constructed as a U-shaped connection element, wherein the first and second rollers of the first roller unit and/or the third and fourth rollers of the second roller unit are placed on ends of the U-shaped connection element of the rocker unit and are secured with a first securing element and a second securing element and the arrangement forms a U-shaped member, and wherein the bearing elements pivotably support the U-shaped member about the rocker axle.

17. The transport device according to claim 12, wherein the first and second rollers of the first roller unit and/or the third and fourth rollers of the second roller unit are constructed with identical roller diameters.

18. A rocker unit for a transport device constructed symmetrically with respect to a curved running rail, wherein the curved running rail comprises a first side flank and a second side flank, wherein the transport device is guided along each of the first and second side flank of the curved running rail, wherein the rocker unit has a rigid connection of rotation axles of a first and second rollers of a first roller unit and/or a rigid connection of rotation axles of a third and fourth rollers of a second roller unit and a rocker axle, wherein the rigid connection is pivotably supported about the rocker axle, and wherein the rocker axle is arranged transversely relative to the running direction of the first and second rollers of the first roller unit and/or the third and fourth rollers of the second roller unit which has the rocker unit.

19. The rocker unit according to claim 18, wherein the rocker unit is constructed in a symmetrical manner, so that the rocker axle is located in an axis of symmetry of the rocker unit and is securely connected to a first carrier device of the transport device, and wherein the first and second rollers of the first roller unit and/or the third and fourth rollers of the second roller unit which has the rocker unit are adjacent to each other.

20. The rocker unit according to claim 18, wherein the rocker unit has bearing elements, wherein the rigid connection of the rocker unit is constructed as a U-shaped connection element, wherein the first and second rollers of the first roller unit and/or the third and fourth rollers of the second roller unit are placed on ends of the U-shaped connection element of the rocker unit and are secured with a first securing element and a second securing element and the arrangement forms a U-shaped member, and wherein the bearing elements pivotably support the U-shaped member about the rocker axle.

\* \* \* \* \*